United States Patent [19]

Chubb

[11] 4,206,746
[45] Jun. 10, 1980

[54] SPIRAL-PASSAGE HEAT EXCHANGER

[75] Inventor: Talbot A. Chubb, Arlington, Va.

[73] Assignee: The United States of America as represented by the Secretary of the Navy, Washington, D.C.

[21] Appl. No.: 876,447

[22] Filed: Mar. 10, 1978

[51] Int. Cl.$^2$ ................................................ F24J 3/02
[52] U.S. Cl. .................................. 126/438; 126/435; 126/442; 165/165
[58] Field of Search .............. 126/270, 271, 438, 442, 126/450, 428, 432, 435; 237/1 A; 60/641, 659; 165/164, DIG. 2, 165

[56] References Cited

U.S. PATENT DOCUMENTS 3,972,183  8/1976  Chubb .................................. 60/641

FOREIGN PATENT DOCUMENTS 716274   9/1954  United Kingdom ...................... 165/165
1328372  8/1973  United Kingdom ...................... 126/271

Primary Examiner—Carroll B. Dority, Jr.
Assistant Examiner—Lee E. Barrett
Attorney, Agent, or Firm—R. S. Sciascia; Philip Schneider; Melvin L. Crane

[57] ABSTRACT

A spiral passage chemical converter-heat exchanger formed by a cross-sectionally rectangular housing containing a pair of rows each containing a plurality of side-by-side passages. The rectangular housing is wound into a spiral with the innermost row forming inlet passages and the outermost row forming outlet passages. Thermal contact exists between inflow passages and outflow passages. The outer end of the spiral is connected with an inlet and an outlet. The inlet joins the innermost row of passages and the outlet joins the outermost row of passages. The inner end of the spiral is capped, with a common wall separating the upper and lower passages slotted so that fluid flows from the inlet passages to the outlet passages. As can be seen when the structure is in a spiral, the inlet passages are between the outlet passages with the outlet passages forming the outer exposed surface of the spiral and the inlet passages forming the surface of the opening through the spiral at the center. A concave sunlight reflector will focus sunlight into the central opening of the spiral thereby heating the fluid in the inlet passages. Since the outlet passages are separated by the inlet passages in the spiral and are in thermal contact therewith, the solar heated outlet fluid will heat the input fluid as it circles the spiral to the outlet passages. Thus, the outlet passages aid in heating the inlet fluid during passage to the inner end of the spiral. The inlet passages may contain a porous catalyst which is prevented from escaping by a suitable structure at each end of the inlet passages for dissociating a fluid for storage of heat for future use.

4 Claims, 13 Drawing Figures

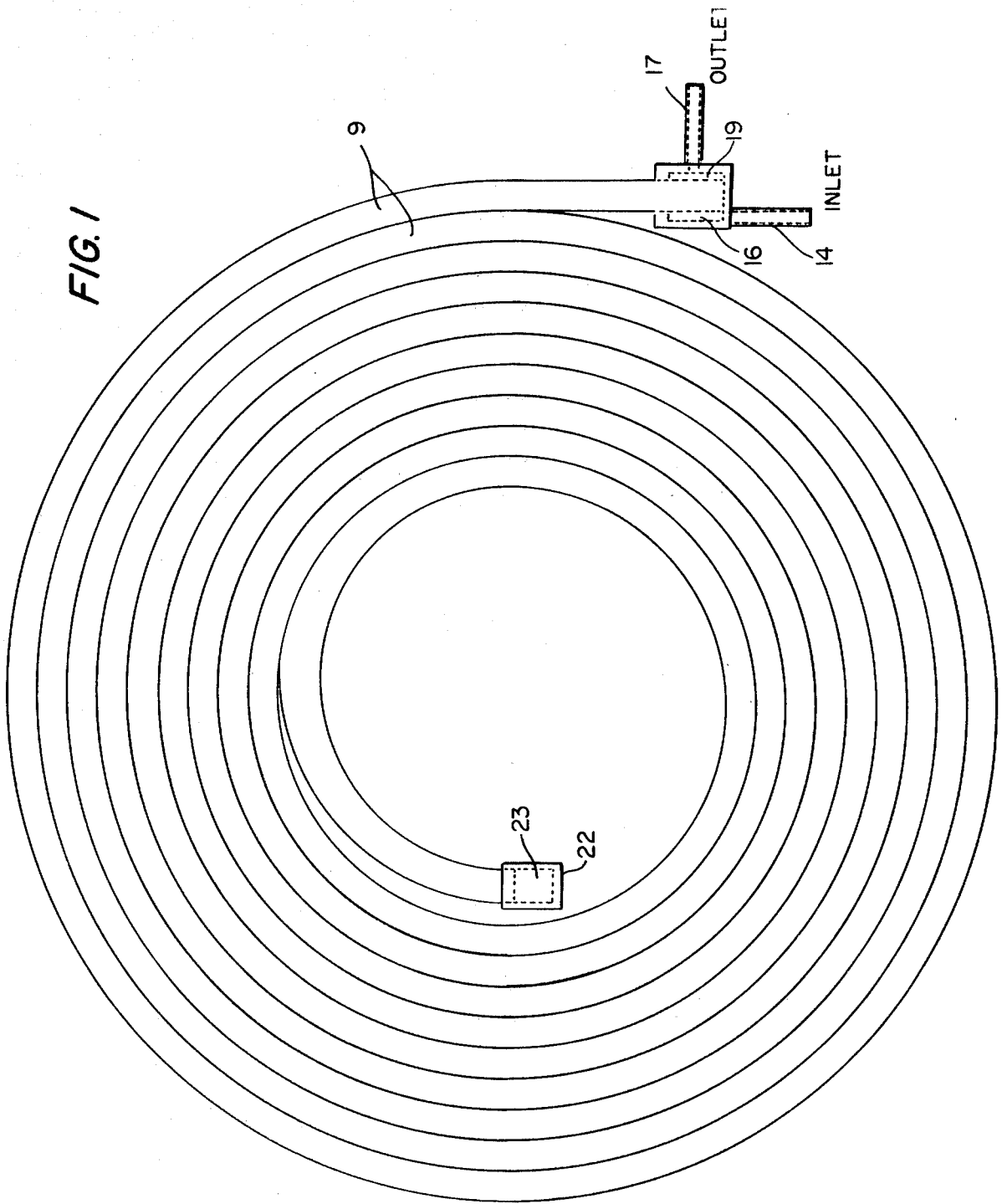

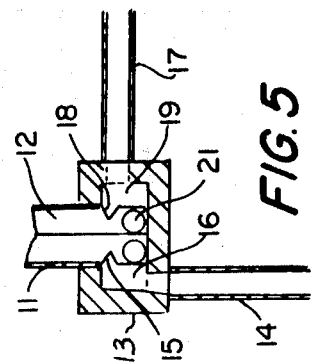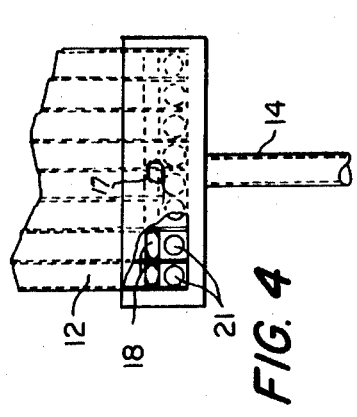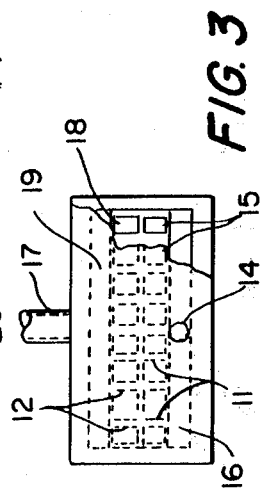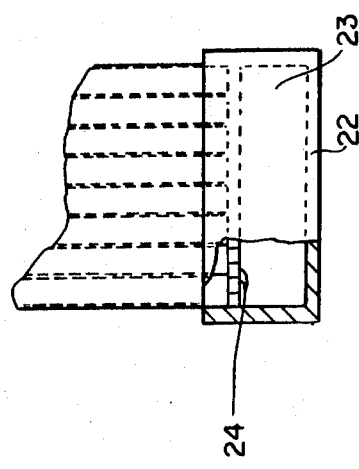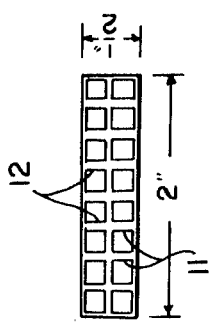

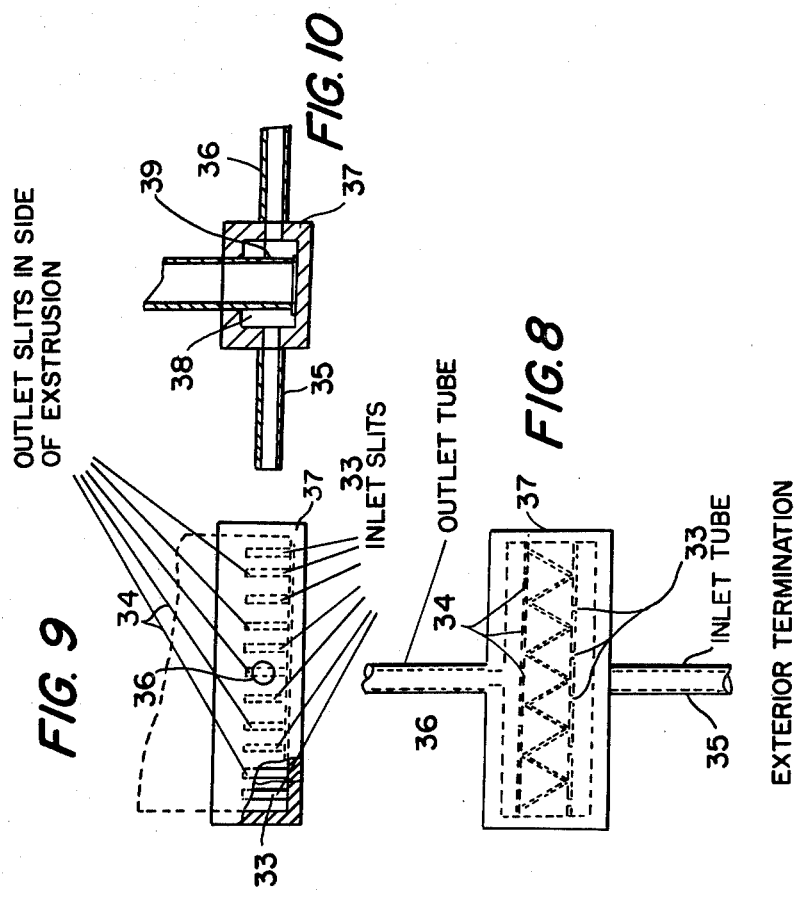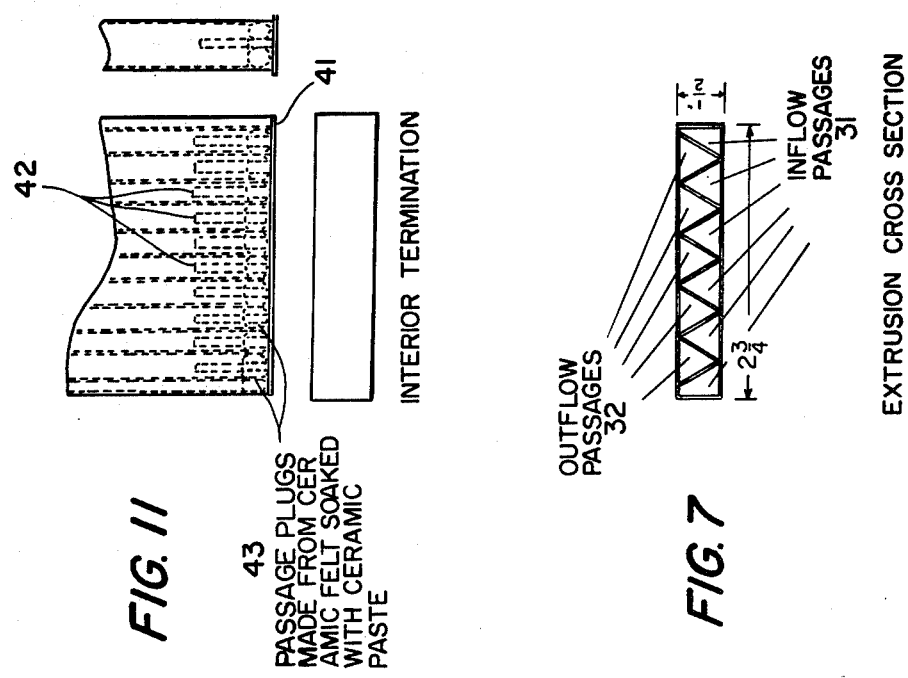

SPIRAL-PASSAGE HEAT EXCHANGER

BACKGROUND OF THE INVENTION

This invention relates to solar energy collector panels and more particularly to an extruded chemical converter/heat exchanger formed in a spiral or coil configuration.

Many different systems have been designed for useful purposes of solar energy. Heat collector systems have been installed on the roofs of buildings, on the sides of buildings and on the ground. These systems have been constructed in different configurations making use of pipes, panels, etc. U.S. Pat. No. 3,868,945 illustrates a plurality of side-by-side pipes which form parallel flow channels through which water flows back and forth from the inlet to the outlet and upon which the sunlight is incident to heat the water as it flows back-and-forth through the parallel piping. U.S. Pat. No. 3,254,644 illustrates piping in a spiral along a conical-shaped section so that the sunlight strikes the piping at an angle as it flows in a continuous line from an inlet to an outlet. U.S. Pat. No. 4,014,314 illustrates a flat spiral in which fluid enters one end of a tube that extends to the center of the spiral in which the fluid flow continuously through the spiral coil and out through the outlet end on the outermost tube of the spiral. The spiral is held together by radial clamps. These prior art systems are only a few of the different designs used in solar heating of different structures. U.S. Pat. No. 3,972,183 is directed to a solar system for gas dissociation. This patent describes a closed cycle, chemical heat means for effecting energy capture and transport. A small chemical converter is mounted at the focus of a solar collector whose function is to receive the inflow of a chemical working fluid, heat the inflowing fluid by heat from the outflowing fluid, further heat the inflow fluid by the sunlight and dissociate a portion of the inflowing fluid in a catalytic converter chamber, to remove heat from the outflowing fluid, and to deliver the cooled outflowing fluid to external piping which conducts the fluid to its place of use as a heat conversion system.

SUMMARY OF THE DISCLOSURE

The converter/heater of this invention is made possible by the extrusion process of a ceramic material. The ceramic extrusion is bendable thereby permitting the structure to be shaped into a cylindrical spiral or coil. The ceramic extrusion is made with parallel passages so that side-by-side passages may be in thermal contact and used as inflow and outflow passages. In this manner the inflowing fluid will be preheated by the outflowing fluid and conversely the outflowing fluid will be cooled by the inflowing fluid. In the preferred arrangement the inflowing passages are on the interior portion of the spiral; therefore, the inflowing fluid is subjected to the heat produced by a concave reflective solar collector which directs the heat into the central area confined by the spiral. A portion of each of the inflowing passages is filled with a porous catalyst material in the form of loosely packed, cylindrical ceramic beads coated with platinum. The catalyst dissociates portions of the inflowing fluid to store heat in the fluid for further use by chemical extraction.

BRIEF DESCRIPTION OF THE DRAWINGS

FIG. 1 illustrates a single coil of square cell ceramic extrustion.

FIG. 2 illustrates the cross-section of one turn of the spiral.

FIG. 3 is an end view partially cut-away to show the parts of the ceramic extrusion which forms the coil of FIG. 1.

FIG. 4 illustrates the inlet-outlet end of the ceramic extrusion.

FIG. 5 illustrates a cross-sectional view of the inlet and outlet end.

FIG. 6 illustrates the inflow-outflow turnaround end of the coil shown in FIG. 1, cut-away to illustrate a portion of the inner parts.

FIG. 7 illustrates an end view of the outlet-inlet end of a modified ceramic extrusion.

FIG. 8 illustrates the inlet-outlet end of the ceramic extrusion shown in FIG. 7.

FIG. 9 is a top view of the inlet-outlet end cut away to show some of the inner parts.

FIG. 10 is a cross-sectional view of the inlet-outlet end of the modification shown in FIG. 5.

FIG. 11 illustrates the inflow/outflow turnaround end of the coil.

DETAILED DESCRIPTION

Figure 13:
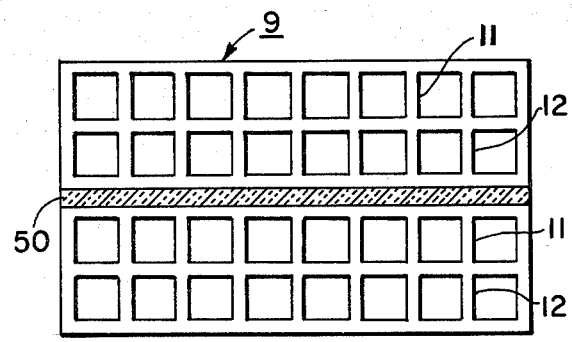
FIG. 13 is a cross-sectional view of a modification including insulation between pairs of input and output passages.

FIG. 1 illustrates a side view of one coil 9 of ceramic extrusion which comprises a plurality of input passages 11 and output passages 12 which have a common wall and parallel each other along the length of the coil as shown in FIGS. 2, 4 and 6. The passages may be of any suitable cross-sectional shape such as square or rectangular, as shown in FIG. 2, or triangular, as shown in FIG. 7. The outermost end of the coil is provided with an exterior terminal 13 including an inlet tube 14 which interconnects with openings 15 near the end of the inlet passages via the spacing or manifold 16 and outlet tube 17 which interconnects with openings 18 near the end of the outlet passages 12 via a spacing or manifold 19 between the terminal end and the plurality of passages (see FIGS. 3 and 5). The ends of each passage are closed off by a ceramic felt 21 and ceramic paste which plugs the ends thereof to seal the respective passages from feeding input fluid directly into the output and for preventing outflow fluid from mixing with the inflow fluid. The inflow fluid follows the inflow passages of the inner end of the coil. The inner end of the coil is provided with end closure 22 which provides a fluid turn-around chamber 23, whereby the inflow fluid in the inflow passages connects with the outflow passages. Each of the interior ends of the inflow passages are provided with a small piece of fine-cell ceramic honeycomb 24 which blocks accidental migration of catalyst beads contained therein into the outflow passages. The catalyst may be in the form of cylindrical ceramic beads coated with platinum. The catalyst material loosely fills the inflowing passages of the innermost three loops of the extrusion spiral. The inflowing fluid passes through the catalyst which is heated by the sunlight reflected by a focusing sunlight collector into the center of the spiral.

The fluid that emerges from the inflow passages 11 enters the inner ends of the outflow passages 12 and follows the outflow passages alongside the inflow passages where the hot outflow fluid heats the inflowing fluid and is cooled to a lower temperature by the transfer of heat to the inflowing fluid. Since the outflow passages and inflow passages are formed within the same ceramic extrusion, which is a sufficient conductor of heat to transfer heat from one passage to its neighbor, the inflowing fluid is subjected to the heat of the outflow fluid along the entire length of the spiral and the inflow fluids are also heated by the solar radiation in the last spiral. As set forth above, the inflow and outflow passages of the inflow-outflow end are blocked so that there is no interchange of fluids from one to the other, except at the interior end of the spiral where the inflowing fluid turns around to become the outflowing fluid.

FIGS. 7-11 are directed to a variation in which the inflow and outflow passages are triangular in shape as shown clearly in a cross-sectional view FIG. 7, and an end view, FIG. 8. In this modification, each of the outflow passages have two flow surfaces in heat transfer contact with the inflow passage so that the heat from the outflowing fluid will heat the inflowing fluid and the inflowing fluid will also be heated by solar radiation incident on the last complete spiral which is subjected to the solar radiation. As shown, the device includes six inflow passages 31 and five outflow passages 32. The spiral is folded or formed such that the inflow passages are on the inside of the spiral and the outflow passages are on the outside surface. The end of the inflow and outflow passages are slit to provide openings 33 and 34 through which fluid entering through the inlet 35 is admitted to the inflow passages and fluid from the outflow passages exits through outlet 36. The inlet and outlet are connected with exterior terminal 37, which closes off the ends of each of the inflow and outflow passages and provides connecting passages 38 and 39 to the inlet and outlet slots, respectively.

The inner ends of the inflow and outflow passages are provided with an inner termination end plate 41 which is secured to the end of the spiral. The end of the common wall between the inflow and outflow passages is provided with a slot 42 which permits the fluid to flow from the end of the inflow passages to the outflow passages. Each of the ends adjacent the inner terminal plate are provided with passage plugs 43 which seal off the ends. The passage plugs are made from ceramic felt soaked with ceramic paste. As described above, the innermost three spirals may be filled with a porous catalyst material in the form of cylindrical ceramic beads coated with platinum and placed loosely within the inflow line. The catalyst beads are prevented from migrating into the outflow passages by the passage plugs 43, and the small size at the slots 42.

In each of the devices described above, the spiral is wound such that the outflow passages are on the outer diameter of the spiral. Also, each of the spiral layers 9 shown in FIG. 1 is in contact with its neighbor. However, suitable operation can be obtained if inflow and outflow channels are interchanged, and or insulating gaps or an insulating material 50 may be provided between extrusion layers (9) as shown in a cross-sectional view FIG. 13.

Figure 12:
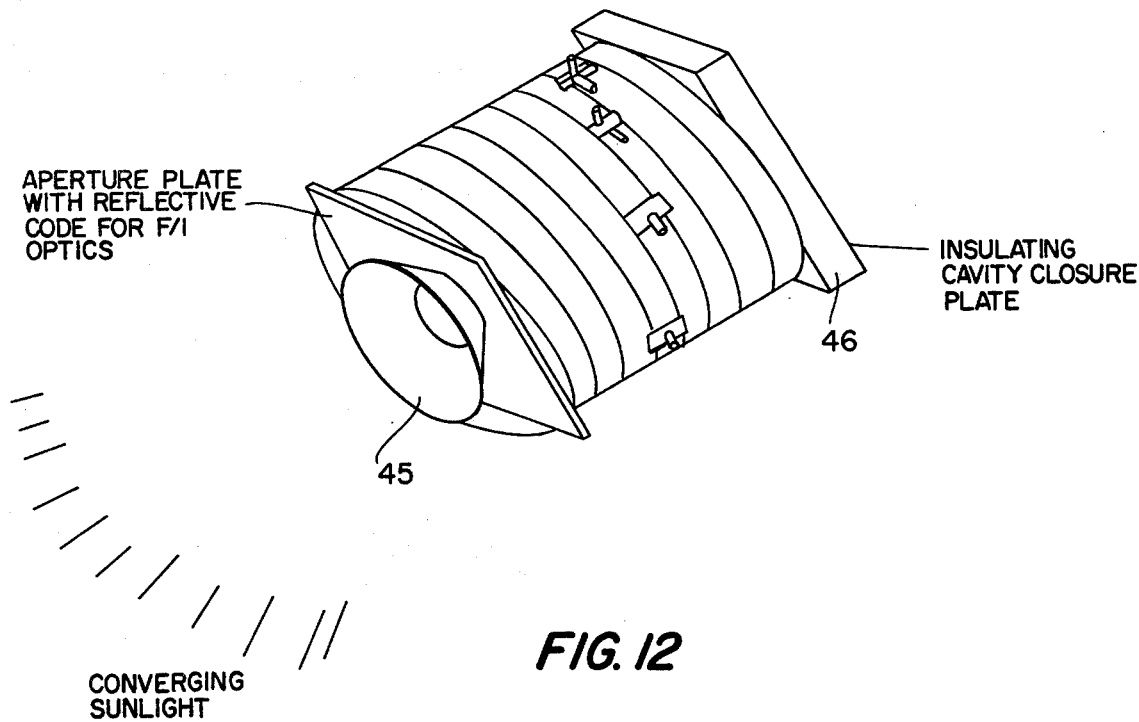
FIG. 12 illustrates a cavity converter-heat exchanger made by use of eight spiral extrusions of the type shown in FIGS. 3-6.

As shown in FIG. 12, a plurality of such spirals may be placed side-by-side with the inlet-outlet ends positioned at different places on the circumference of the entire assembly. Thus, one inflow-outflow end will not interfere with the other. A conical reflector 25 reflects stray convergent solar radiati into the axial central area defined by the assembly. A heat insulator back plate 26 closes the opposite end of the assembly to confine the reflected solar radiation to the central area. The drawing is shown with eight spiral devices assembled together. The assembly may be connected to a common outlet manifold and a common inlet manifold.

In operation, one or more extruded spirals each with a plurality of passages are assembled side-by-side, and the assembly FIG. 12 is mounted at the focus of a solar-collector such that solar radiation is reflected into the central area by said solar collector. Improperly directed sun rays are also reflected into the apperture by conical reflector 25. A chemical working fluid is directed into the inflow passages through the inlet and inlet manifold. The inflow fluid flows in thermal contact along the outflow lines and, after the initial inflowing fluid is heated by the solar radiation, the outflow fluid heats the inflowing fluid with additional heating along the centermost spiral due to the reflected incident solar energy. Thus, the inflowing fluid is heated both by the outflowing fluid and the solar radiation. Since the inner last three turns of the spiral include a catalyst therein through which the inflowing fluid passes, the inflowing fluid may be chemically changed by dissociation upon absorbing suffucient heat, effecting energy capture during dissociation. The fluid with captured energy then flows through the outflow spiral along which it gives off heat to the inflowing fluid. Also, the last turn of the spiral is exposed to the atmosphere so that it also gives off heat to the atmosphere. Thus, the dissociated fluid may exit the collector at a cooler temperature and may subsequently be transported to a distant location at a cooler temperature, there upon reconversion back to its original fluid state, it will give off heat during the conversion for operation of a heat system, such as a steam generator. Thus, by this system captured energy may be transported at a cooler temperature and yet carry out its intended purpose.

The chemical converter-heat exchanger of this invention may replace the solar collector gas dissociation device described in U.S. Pat. No. 3,972,183 wherein sulfur trioxide, $SO_3$, is heated in the inner spiral to about 950° by the sun. The $SO_3$ dissociates into $SO_2 + O_2$ with absorption of heat. The $SO_2 + O_2 +$ heat is directed through the outflow channel by which the hot gas is cooled by the inflowing gas absorbing heat from the outflowing gas. The cooled gas is then directed to a gas conversion chamber such as shown in U.S. Pat. No. 3,972,183 where the absorbed heat is given off by recombination of the gases to form $SO_3$. The $SO_3$ is then pumped back to the chemical converter-heat exchanger to be heated again by the sun in a continuous cycle. The heat given off in the recombination chamber may be used to convert water to steam for generating electrical energy by a steam-generator.

As an example of structure, each turn of the extruded spirals as shown in FIGS. 1-7, may have a cross-sectional measurement of ½ inch by two inches and contain eight inflow and outflow passages as shown in FIG. 2. The spiral, FIG. 1, may comprise ten layers, each ½ inch thick, and the spiral may have a six-inch inner diameter, a sixteen-inch outer diameter with an uncoiled length of 29 feet. Eight of these spirals may be assembled side-by-side as shown in FIG. 12 to form a chemical converter-heat exchanger subjected to incident solar energy. It is obvious that the assembly could be made with a larger diameter, with wider or narrower spirals, and with a greater number of spirals. With advanced technology one may be enabled to extrude an assembly of a desired width which will not require an assembly with a plurality of separate extruded spirals.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A chemical converter-heat exchanger comprising:
   a plurality of coils assembled side-by-side along the same axis,
   each of said coils comprising a spiral including a plurality of loops,
   each loop of said spiral including at least one fluid inflow passage and at least one fluid outflow passage and having a common wall with said inflow passage diametrically inward of said fluid outflow passage;
   inlet means and outlet means forming a separate inlet and outlet end at the exterior end of said coils near the exterior end of said inflow passage and said outflow passage for admitting fluid into said inflow passage and allowing fluid to exit from said fluid outflow passage;
   means preventing intermixing of inflow fluid with outflow fluid at said separate inlet and outlet ends of each of said fluid inflow passage and said fluid outflow passage at the exterior end of each of said coils;
   an inlet-outlet end connector at the interior end of said fluid inflow passage and said fluid outflow passage of each of said coils to switch fluid from said inflow passage to said fluid outflow passage of each of said coils;
   a conical solar energy reflector arranged to receive solar radiation into the area confined by said plurality of coils when the coil assembly in mounted at the focus of a focusing sunlight reflector; and
   a backing plate which prevent heat from escaping from the confined area of said coils,
   whereby inflowing fluid will be heated by sunlight focused into the area confined by said assembled coil and inflowing fluid will be heated in each loop of said coil configuration by the outflowing fluid.

2. A chemical converter-heat exchanger as claimed in claim 1 in which:
   each of said coils is formed with more than one fluid inflow passage and with more than one fluid outflow passage paralleling each other.

3. A chemical converter-heat exchanger as claimed in claim 2 wherein:
   said fluid inflow passages and said fluid outflow passages in each spiral are formed into a double layer of passages and
   each double layer is separated from each other by an insulating material.

4. A chemical converter-heat exchanger as claimed in claim 2 in which:
   said inflow passages include a catalyst therein in the area near the inner end thereof.

* * * * *